United States Patent [19]

Andrieu et al.

[11] Patent Number: 4,940,635
[45] Date of Patent: Jul. 10, 1990

[54] PROCESS TO ENCAPSULATE GRAPHITE INTO GLASS AND GLASS CERAMIC ARTICLES, AND ARTICLES MANUFACTURED BY THIS PROCESS

[75] Inventors: Andre Andrieu, Nemours; Jean-Pierre P. Davot, Avon; Jean-Pierre A. M. Thibieroz, Samoreau, all of France

[73] Assignee: Corning Incorporated, Corning, N.Y.

[21] Appl. No.: 275,442

[22] Filed: Nov. 23, 1988

[30] Foreign Application Priority Data

Nov. 24, 1987 [FR] France ................. 87 16244

[51] Int. Cl.$^5$ .............................................. B32B 9/00
[52] U.S. Cl. ...................................... 428/408; 501/32; 501/7; 65/36; 65/42; 65/48
[58] Field of Search ................. 501/32, 7; 428/408; 65/36, 42, 48; 55/523, 208

[56] References Cited

U.S. PATENT DOCUMENTS 4,248,925  2/1981  Ambrogi ..................... 428/212
4,260,405  4/1981  Ambrogi ...................... 65/42

Primary Examiner—Mark L. Bell
Assistant Examiner—Deborah Jones
Attorney, Agent, or Firm—Stephen R. Christian

[57] ABSTRACT

Process to manufacture glass or glass ceramic articles with a graphite insert encapsulated therein, characterized by the fact that said encapsulation is made in the presence of one or several gas getter metals chosen among aluminum, chromium, niobium, tantalum, titanium and zirconium.

20 Claims, 1 Drawing Sheet

PROCESS TO ENCAPSULATE GRAPHITE INTO GLASS AND GLASS CERAMIC ARTICLES, AND ARTICLES MANUFACTURED BY THIS PROCESS

BACKGROUND OF THE INVENTION

The present invention sets forth an improved process for encapsulating at least one piece of graphite within a glass or glass ceramic articles, in order, in particular, to improve heat spreading in glass ceramic cookware intended for direct heating on top of stoves, either gas or electric. With this improved process it is possible to make new products, not feasible with the encapsulation processes known until now, such as described, in particular, in the U.S. Pat. Nos. 4,248,925 and 4,260,405.

The above patents describe manufacturing of glass ceramic articles containing a graphite insert, said articles being cerammed around 900° C. and intended for cooking on top of stoves.

At such ceramming temperatures, usually transparent glass ceramics are obtained, consisting of a stuffed $\beta$-quartz solid solution. Nevertheless, it may be desirable to ceram at a higher temperature, around 1100° C. to obtain an opaque glass ceramic, with a $\beta$-spodumene structure, which is stronger and is a good substrate for decoration.

SUMMARY OF THE INVENTION

Now it has been found that if articles made according to the above patents are heated up to temperature for opaque ceramming, they break or swell every time. The analysis of this phenomenon has indicated that it occurs when the stuffed $\beta$-quartz solid solution structure characteristic of the transparent glass ceramic turns into the $\beta$-spodumene structure typical of the opaque glass ceramic.

It has been assumed that the stresses responsible for breakage or swelling, according to the viscosity of the material when this phenomenon occurs, are the consequence of a chemical reaction between graphite or impurities contained therein and the oxides constituting the glass, said reaction producing carbon oxides, capable to build a gas pressure in the cavity surrounding said graphite.

Therefore a new process is needed to manufacture opaque glass ceramic articles with a graphite insert.

Moreover, the graphite inserts described in the aforesaid patents were sliced from extruded or pressed synthetic graphite logs. For easier cutting and lower cost, it would be useful to be able to use graphite foil. But, whenever a graphite foil thick enough to spread heat sufficiently is encapsulated according to aforesaid patents, it swells as soon as the pressing plunger is removed. Swelling of the graphite foil is assumed to be a consequence of desorption and thermal expansion of gases included between the parallel layers of flat crystals constituting the graphite foils; on the contrary, the graphite from logs is nearly isotropic, its pores are randomly oriented, so that the gases can evolve when the insert (usually a disc) is heated, lying on the first gob, before being encapsulated under the second gob.

Therefore a new process is also needed to manufacture glass or glass ceramic articles with a graphite insert made from a graphite foil.

The instant invention provides means to fulfill the above needs.

These and additional objects, features and advantages of the present invention will become apparent to those skilled in the art from the following detailed description and the accompanying drawings, which is incorporated and constitutes part of the present specification, on which, by way of example, only the preferred embodiments of this invention are illustrated.

DESCRIPTION OF THE PREFERRED EMBODIMENTS

Figure 1:
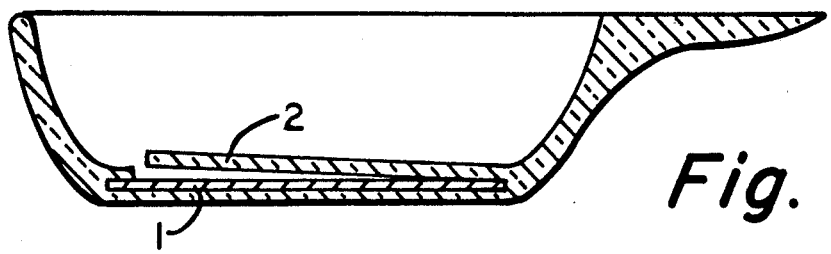
FIG. 1 is a cross-sectional view of an article broken during opaque ceramming. The fracture origin is located at the periphery of the cavity, where the tensile stress is maximal in case of excessive pressure in the cavity.

It is to be noted that the drawings are illustrative and symbolic of the present invention and there is no intention to indicate scale or relative proportions of the elements shown therein.

On the drawings, reference numeral 1 indicates the graphite insert, while reference numeral 2 indicates the glass ceramic of the article in which the graphite insert is encapsulated.

We have discovered that some metals, particularly capable to enter into combination with oxygen or to absorb gases, resolve both above problems, i.e. opaque ceramming of glass ceramic articles containing a graphite insert, and encapsulation of graphite foils within glass articles, intended or not to become glass ceramic articles.

More precisely, in the new process for making a glass or glass ceramic article with a graphite insert, the encapsulation is characterized by the presence, in the cavity with the graphite, of one or several gas getters shown among the following metals: aluminum, chromium, niobium, tantalum, titanium and zirconium.

The above six metals are all usable but are not effective to the same degree. Zirconium and tantalum are the most effective, since they operate in the most difficult conditions, i.e. when opaque ceramming is combined with the use of graphite foil. Chromium, niobium, titanium and aluminum are less universal and their use will be adequate only for less difficult conditions.

The effectiveness of the metals as gas getters depends on other various factors such as graphite purity, the process along with the presence of the metal in the encapsulation cavity is provided, the ceramming temperature, and the proportion of metal in relation to the amount of graphite.

When the graphite contains higher amounts of oxidizable elements such as sulfur, iron or calcium, more metal is needed as gas getter.

The gas getter metal can be provided in the cavity by various ways during the encapsulation. The metal can be, for example, dispersed, uniformly or not, inside of graphite; it can be spread onto the surface of the insert as a coating; it can be incorporated within a second piece of graphite lying on the main insert during encapsulation.

A uniform incorporation of metal within graphite (either the main insert or a secondary piece) can be made, for example, by carefully mixing metal powder and graphite powder, then pressing the mixture into the desired shape.

A non uniform incorporation can be made, for example, by drilling many holes through the graphite insert, then filling up the holes with metal powder.

Coating the graphite insert with metal can be done, for example, by vacuum deposition, with a plasma spray gun, by spreading a metal suspension (by silk screening or pad printing), and the like.

The following processes are the most effective, probably because they prevent premature oxidation of the metals: uniform incorporation of metal within graphite (insert or secondary piece) and coating of the insert, either by vacuum deposition or by plasma spraying.

Ceramming temperature is also a key factor for the selection of the metal and the required amount.

As a consequence of all above, it is not possible to indicate the amount of metal required in each case; the professional will have to do some experiments, taking into account the nature of the metal, the way it is used, the nature of the graphite insert, the ceramming schedule (if ceramming is considered), in order to be able to determine the right amount of metal required to obtain a satisfactory encapsulation. For guidance it can be stated that the minimum amount of metal required is approximately the quantity which would coat the whole surface of the insert with a 0.5 $\mu$m thick layer, for the articles intended only for a transparent ceramming, and a 1 $\mu$m thick layer for an opaque ceramming, assuming that the metal layer would be uniform at the whole interface between graphite and glass (even if practically the metal is incorporated within the insert or within a secondary graphite piece).

It should be understood that the use of a metal amount equal to or slightly higher than the amount indicated above for guidance, will not necessarily give a satisfactory result, because of the multiplicity of factors to be considered. The above amounts are only minimums under which no satisfactory or reproducible results can be expected. It has been observed also that chromium is not sufficient for opaque ceramming.

The following examples have been chosen among the most typical experiments, to illustrate the need and the effectiveness of some metals as gas getters.

EXAMPLE 1

The graphite insert to be encapsulated is a disc, diameter 184 mm and 1.4 mm thick, cut from an extruded graphite log supplied by Union Carbide France as code SF 18, characterized in particular by a mean thermal expansion coefficient between 25° and 300° C. of 3.6 $MK^{-1}$. This disc is encapsulated in the green glass of the glass ceramic Corning code 9608, according to the process described in the U.S. Pat. No. 4,260,405. The glass article is then heat treated according to the following schedule to be turned into a glass ceramic: heating in 60 min up to 820° C., nucleating for 30 min, heating up to 1100° C. at 4 K/min, crystallization hold of 15 min and uncontrolled cooling.

Figure 2:
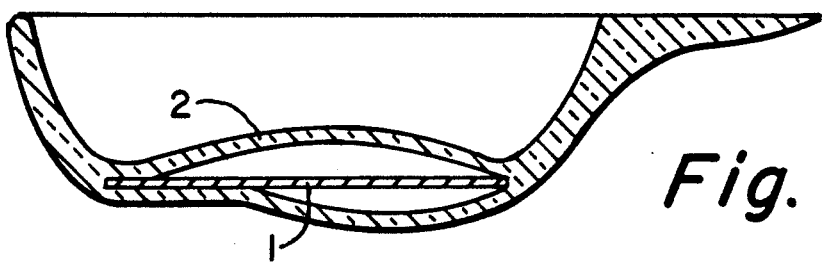
FIG. 2 is a cross-sectional view of an article swollen during opaque ceramming. Swelling can be either non-symmetrical, as represented, or symmetrical.

The article obtained at the end is broken as represented by FIG. 1. Certain variations of the ceramming temperature schedule would give swollen articles as represented by FIG. 2.

EXAMPLE 2

The graphite insert to be encapsulated is a disc, diameter 180 mm, cut from a graphite foil, Papyex® N brand, 1 mm thick, density 1.1 g/cm$^3$ supplied by Le Carbone Lorraine.

Figure 3:
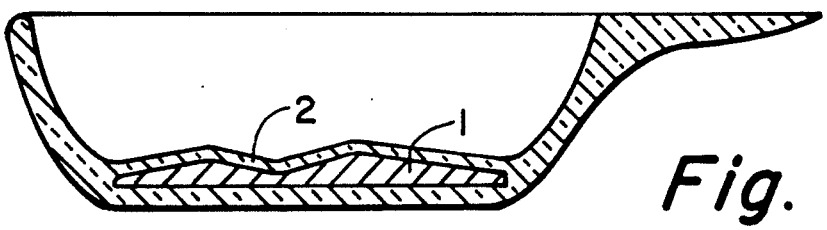
FIG. 3 is a cross-sectional view of an article whose graphite foil has swollen just after encapsulation.

That disc is encapsulated in the same glass and along the same process as in example 1. As soon as the pressing plunger is removed, the bottom on the article becomes wavy, because of swelling of the graphite foil, as depicted by FIG. 3.

EXAMPLE 3

A graphite disc identical to the disc of example 1 is first coated, on one face, with a plasma spray gun, with a titanium layer, 9 $\mu$m thick.

The disc is then encapsulated, and the article is cerammed, like in example 1. The article obtained at the end is undamaged and its section looks exactly like FIG. 4.

This section indicates that the graphite has remained in intimate contact with the glass ceramic, and that there has been no gas release in the cavity. This good contact is proved also by a ball drop test on the bottom of the article. While the article lies on three hemispherical supports, a steel ball weighing 56 g is dropped on the center of the bottom from increasing altitudes, until the article is damaged or broken. When the graphite is bound with a glass ceramic, the bottom behaves mechanically like a continuous composite solid, and fracture is initiated by bending on the lower face, on the face opposite to the impact, when the drop height reaches a certain value, 55 cm in our example. On the contrary, when the graphite was not bound with the glass ceramic, as was the case of example 1, which looked like FIG. 2, the glass ceramic layer over the graphite broke first, and for a drop height much smaller, 31 cm in average in example 1, where there was no metal as gas getter.

EXAMPLE 4

The graphite insert to be encapsulated is a disc identical to the disc of example 1. A quantity of 2.7 g of niobium powder (just what would be necessary to coat both faces with a 5 $\mu$m thick layer) is mixed with 2.5 g of natural graphite powder, and pressed into a pellet diameter 42 mm and 1 mm thick.

During encapsulation of the disc, in the same glass and by the same process as in example 1, the above pellet is set on the graphite disc, before the second gob arrives on the insert.

Figure 4:
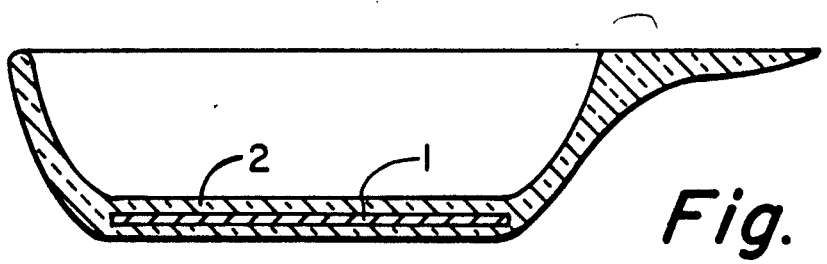
FIG. 4 is a cross-sectional view of an article whose graphite insert, properly coated or impregnated with a metal as gas getter, stays undamaged, as well as the glass ceramic encapsulating it, and with which has remained in intimate contact until after ceramming, either transparent or opaque.

The article is then cerammed like in example 1 and an undamaged article is obtained, like depicted by FIG. 4.

EXAMPLE 5

The graphite insert to be encapsulated is a graphite foil impregnated with chromium, made as follows from expanded graphite.

Natural graphite powder, code S 18590 from Le Carbone Lorraine, is mixed with a sulfuric acid solution of potassium dichromate, at the concentration of 10 g of graphite in 90 g of a 2% solution of $K_2Cr_2O_7$ in concentrated $H_2SO_4$. After soaking 1 h, the powder is filtered, rinsed with water, and treated at 900° C. in a kiln, where it expands up to a density of only 30 g/l.

This expanded graphite is mixed with 3.2 g of chromium powder, then pressed at 14 MPa, to be molded as a disc diameter 42 mm, 1 mm thick, with a density 1.4 g/cm$^3$.

This graphite foil is encapsulated in the green glass of the Corning glass ceramic code 9607, according to the process described in the U.S. Pat. No. 4,260,405. The glass article which looks like FIG. 4, remains unaltered even after then final heat treatment which turns it into a transparent glass ceramic: heating in 30 min up to 780° C., 30 min nucleation hold, heating up to 900° C. at 4 K/min, 15 min crystallization hold and uncontrolled cooling.

EXAMPLE 6

The insert to be encapsulated is a disc cut from a graphite foil identical to example 2. A face of the disc is coated by silk screening with an aluminum powder previously mixed with a squeegee oil supplied as code 63/2 by Blythe Colors, Ltd. of Stoke on Trent, U.K. The coating is 20 μm thick in average, expressed as pure metal. The coated disc is dried at 100° C., then encapsulated in the same glass and according to the same process as for example 5. After the same heat treatment, the final article has also the good appearance depicted by FIG. 4.

EXAMPLE 7

The insert to be encapsulated is a disc cut from a graphite foil identical to the one used in example 2. This disc is previously impregnated with zirconium in the following way.

Holes, having a diameter of about 0.5 mm, are drilled through the foil; zirconium powder is spread over the disc, which is then pressed between the flanges of a press exerting on the foil a pressure of 15 MPa. The amount (4.1 g) of zirconium impregnating the disc is the amount which would be necessary to cover each face with a uniform 10 μm thick layer.

The disc is then encapsulated in the green glass of the Corning glass ceramic code 9607. The article so obtained is first cerammed transparent along the thermal schedule described in example 5, and its appearance is as depicted in FIG. 4. In a second step, the article is treated at 1120° C. for 20 min to be turned into an opaque glass ceramic; the article obtained still looks, in section, like FIG. 4, which indicates that the graphite has remained in contact with the glass ceramic, without any swelling of the cavity.

EXAMPLE 8

The insert to be encapsulated is a graphite foil identical to the one used in example 2. This disc is previously impregnated with tantalum (10 g) in the same way as the disc of example 7 was impregnated with zirconium.

The disc is then encapsulated in the green glass of Corning glass ceramic code 9608, and cerammed along the schedule described in example 1. The article obtained looks like FIG. 4.

The present invention has been particularly shown and described with reference to preferred embodiments thereof, however, it will be understood by those skilled in the art that various changes in the form and details may be made therein without departing from the true spirit and scope of the invention as defined by the following claims.

We claim:

1. In a method for press forming a composite glass-ceramic article having a heat conducting, graphite insert fully encapsulated therewithin which comprises the steps:
   (a) delivering a first charge of molten glass to a mold;
   (b) pressing said first charge into an initially formed article while simultaneously pressing said heat conducting graphite insert within one surface thereof;
   (c) depositing a second charge of molten glass upon said initially formed article;
   (d) pressing said second charge of molten glass into a finished integral article incorporating said initially formed article and simultaneously fully encapsulating said insert therewithin; and then
   (e) heat treating said glass article to convert it into a glass-ceramic article;
   the improvement which comprises incorporating at least one gas getter metal selected from the group consisting of aluminum, chromium, niobium, tantalum, titanium, and zirconium with said insert in an amount at least sufficient to provide a coating on the entire surface of said insert having a thickness of at least 0.5 micrometers.

2. In a method according to claim 1 wherein said gas getter metal is dispersed within said insert.

3. In a method according to claim 1 wherein said gas getter metal is coated onto the surface of said insert.

4. In a method according to claim 1 wherein said gas getter metal is incorporated within a second piece of graphite encapsulated with said insert.

5. In a method according to claim 1 wherein said glass-ceramic is transparent.

6. In a method according to claim 1 wherein said glass-ceramic is opaque and said gas getter metal is selected from the group consisting of aluminum, niobium, tantalum, titanium, and zirconium.

7. In a method according to claim 6 wherein said gas getter is incorporated in an amount sufficient to provide a coating on the entire surface of said insert having a thickness of at least 1 micrometer.

8. In a method according to claim 1 wherein said insert comprises a graphite foil formed by rolling or pressing expanded graphite within which at least one of said gas getter metals has been mixed.

9. A transparent glass ceramic product containing a cavity having defined surfaces and wherein a graphite foil is fully encapsulated within the cavity, the improvement comprising:
   (a) said graphite foil fully contacting said cavity surfaces; and
   (b) the presence of at least one gas getter metal within said cavity; and
   (c) said gas getter metal being from a group of metals consisting of aluminum, chromium, niobium, tantalum, titanium, zirconium existing in their elemental states or as oxides or other compounds resulting from chemically reacting with the glass ceramic product or the graphite foil.

10. The product according to claim 9 wherein:
   (a) at least one of said gas getter metals is present within the cavity in the form of a coating acting as an interface between the graphite insert and the cavity surfaces; and
   (b) said coating having a uniform thickness of approximately 0.5 micrometers.

11. An opaque glass ceramic product containing a cavity having defined surfaces and wherein a graphite insert is fully encapsulated within the cavity, the improvement comprising:
(a) said graphite insert being formed by slicing a pressed or extruded graphite log or by trimming a graphite foil;
(b) said graphite insert fully contacting said cavity surfaces; and
(c) the presence of at least one gas getter metal within said cavity; and
(d) said gas getter metal being from a group of metals consisting of aluminum, chromium, niobium, tantalum, titanium, zirconium existing in their elemental states or as oxides or other compounds resulting from chemically reacting with the glass ceramic product or the graphite insert.

12. The product according to claim 11 wherein:
(a) at least one of said gas getter metals is present within the cavity in the form of a coating acting as an interface between the graphite insert and the cavity surfaces; and
(b) said coating having a uniform thickness of approximately 1 micrometer.

13. In a method for press forming a composite glass article having a heat conducting, graphite insert fully encapsulated therewithin which comprises the steps:
(a) delivering a first charge of molten glass to a mold;
(b) pressing said first charge into an initially formed article while simultaneously pressing said heat conducting graphite insert within one surface thereof;
(c) depositing a second charge of molten glass upon said initially formed article; and then
(d) pressing said second charge of molten glass into a finished integral article incorporating said initially formed article and simultaneously fully encapsulating said insert therewithin; the improvement which comprises incorporating at least one gas getter metal selected from the group consisting of aluminum, chromium, niobium, tantalum, titanium, and zirconium with said insert in an amount at least sufficient to provide a coating on the entire surface of said insert having a thickness of at least 0.5 micrometers.

14. In a method according to claim 13 wherein said gas getter metal is dispersed within said insert.

15. In a method according to claim 13 wherein said gas getter metal is coated onto the surface of said insert.

16. In a method according to claim 13 wherein said gas getter metal is incorporated within a second piece of graphite encapsulated with said insert.

17. In a method according to claim 13 wherein said glass is transparent.

18. In a method according to claim 13 wherein said glass is opaque and said gas getter metal is selected from the group consisting of aluminum, niobium, tantalum, titanium, and zirconium.

19. In a method according to claim 18 wherein said gas getter is incorporated in an amount sufficient to provide a coating on the entire surface of said insert having a thickness of at least 1 micrometer.

20. In a method according to claim 13 wherein said insert comprises a graphite foil formed by rolling or pressing expanded graphite within which at least one of said gas getter metals has been mixed.

* * * * *